United States Patent [19]

Graham et al.

[11] 4,184,031
[45] Jan. 15, 1980

[54] CONTROL OF CURE RATE OF POLYURETHANE RESINS

[75] Inventors: William H. Graham; Inella G. Shepard, both of Huntsville, Ala.

[73] Assignee: Thiokol Corporation, Newtown, Pa.

[21] Appl. No.: 841,221

[22] Filed: Oct. 11, 1977

Related U.S. Application Data

[62] Division of Ser. No. 740,994, Nov. 11, 1976, Pat. No. 4,110,135.

[51] Int. Cl.$^2$ .................. C08G 18/26; C08G 18/22; C08G 18/24; C08G 18/62
[52] U.S. Cl. ........................................ 528/55; 528/57; 528/58; 528/61; 528/65; 528/73; 528/75; 252/410; 149/19.4
[58] Field of Search .................. 260/77.5 AB, 75 NB, 260/77.5 CR; 528/55, 57, 58, 73, 75, 61, 65

[56] References Cited

U.S. PATENT DOCUMENTS

| | | | |
|---|---|---|---|
| 2,929,800 | 3/1960 | Hill | 528/59 |
| 3,194,770 | 7/1965 | Hostettler | 252/431 |
| 3,235,518 | 2/1966 | Hostettler et al. | 260/2.5 |
| 3,476,933 | 11/1969 | Mendelsohn | 260/2.5 AB |
| 3,493,540 | 2/1970 | Muller et al. | 528/73 |
| 3,666,835 | 5/1972 | Schloss | 260/858 |
| 3,681,272 | 8/1972 | Gloskey | 260/77.5 AB |
| 3,892,715 | 7/1975 | Bonin et al. | 260/77.5 AB |
| 3,919,174 | 11/1975 | Taller | 260/77.5 AB |
| 4,124,568 | 11/1978 | Zecher et al. | 528/73 |

OTHER PUBLICATIONS

Saunders et al., Polyurethanes, Part II, Interscience (New York), 1964, pp. 299–301, 8–32.

Primary Examiner—H. S. Cockeram
Attorney, Agent, or Firm—Stanley A. Marcus; Royal E. Bright

[57] ABSTRACT

Curing catalysts comprising organo metallic compounds, and carboxylic acids or compounds convertible thereto, processes for their use and compositions containing them are disclosed. The compositions enable the control of the curing rate profile of hydroxy terminated polybutadiene based urethane propellant binders, and the cure rate profile of polyurethane resin systems generally.

9 Claims, No Drawings

CONTROL OF CURE RATE OF POLYURETHANE RESINS

This is a divisional, of application Ser. No. 740,994 filed Nov. 11, 1976 now U.S. Pat. No. 4,110,135.

BACKGROUND OF THE INVENTION

This invention is related to solid fuel propellants, more particularly to hydroxy terminated polybutadiene based urethane binders therefore, processes for their cure and catalysts suitable for use therein. This invention is also related to polyurethane casting resins in general, catalysts for their cure, processes for their use, and cured articles formed thereby.

Composite solid propellants normally comprise a rubbery phase which is intimately admixed with, serving as a binder for, such additional solid ingredients as ammonium perchlorate or other oxidizers, finely divided aluminum, or other metallic fuel, and to a minor extent such other additives as, for example, iron oxide. The polyurethane binder system is known to impart superior physical and mechanical properties to the propellant. U.S. Pat. No. 3,245,849, the disclosure of which is incorporated herein by reference, is illustrative.

Very frequently the polyurethane binder will be one based upon hydroxy terminated polybutadiene. The prepolymer precursor for the polyurethane will then be a polymer having repeating butadiene units with terminal hydroxyls and a molecular weight of about 3000. In addition, hydroxyl groups are substituted along the chain so that the average number of hydroxyl groups per polymeric unit is in the range of from 2.1 to 2.7. The additional hydroxyl functions, of course, provide sites for cross-linking which is particularly important because the common polyisocyanates used for curing are difunctional.

As stated, curing is due to the reaction between the hydroxyl functions and the polyisocyanate. It is desirable that the speed of this curing reaction be controlled so that the mixture remains fluid [viscosity below about 40 Kp (pot life)] for a sufficient time to allow casting or other manipulation into the final desired form, and so that curing can then take place in a reasonable length of time under sufficiently mild conditions that no stresses or other mechanical defects are induced into the finished propellant grain, or that no excessive thermal input initiates undesirable chemical reactions among the highly energetic materials present. A shorter curing time of course also allows for savings in power consumption, greater put through capacities for cure ovens, and more rapid turn around for rocket hardware where reuse is possible. The use of catalysts to speed up the cure reaction is of course well-known, but at the temperature normally employed in processing and curing, normally between 63° C. and 76° C., to get adequate pot life, desirably in the area of about 8 to 14 hours. requires that the cure time then range from about 7 to 14 days.

The present invention enables the shortening of the cure time while allowing a desirably long pot life.

It has long been a general problem that in casting large polyurethane objects, that the difficulty in transferring large quantities of blended resin into the desired mold leads to inhomogeneities in the final product. Naturally once the cure agent is added to the mix, cure begins even while the material is being transferred from the mixing vessel to the mold. Material added early is thus less cured and more fluid than later added material. These changes in initial viscosity are translated into variation in properties in the final cured product. Attempts to avoid this problem by blending a system which is only slowly reactive at mixing and casting temperatures followed by thermal acceleration after completion of casting to complete the cure must contend with the expense of large scale heating equipment and the cost of the energy for its operation, the difficulty with getting uniform heat transfer throughout a large object, and the stress and strain induced upon cooling from the elevated temperature employed back to ambient levels. Both the lack of uniform heating and cooling stresses and strains will obviously lead to property variation throughout the final cured product.

The present invention enables the extension of the pot life for these systems also while allowing cure to take place without requiring application of excessive heat while permitting uniform cures in short time periods.

SUMMARY OF THE INVENTION

The invention provides a composition of matter which comprises a metallo organic compound, and a carboxylic acid or a compound convertible thereto by reaction with Zerewitinoff active hydrogen.

The tangible embodiments of this composition aspect of the invention possess the inherent applied use characteristic of catalyzing the cure reaction of hydroxyl terminated polybutadiene prepolymers with polyisocyanates at normal solid propellant process and curing temperatures, so that a long pot life is retained while cure after forming in place is accelerated. They also possess the inherent applied use characteristic of catalyzing the reaction of polyurethane prepolymers with curing agents enabling the retention of long pot life while accelerating the cure reaction.

Preferred embodiments of this composition aspect of the invention are those wherein the metallo organic compound is derived from the metals bismuth, lead, tin, arsenic or zinc and from the organic moieties phenyl, tolyl, benzyl, naphthyl, lower alkyl of 1 to 20 carbon atoms, or cycloalkyl of 5 to 20 carbon atoms. Also preferred are those wherein the compound convertible to a carboxylic acid by reaction with Zerewitinoff active hydrogen is a carboxylic acid anhydride; and those wherein there is additionally present a metal oxide selected from magnesium or calcium oxide.

Special mention is made of the above preferred embodiments wherein the carboxylic acid is selected from such aromatic acids as, for example, benzoic, toluic, or salicylic, and such non-aromatic acids, as for example, acetic, butyric, linoleic, oleic, or maleic. Special mention is also made of the above preferred embodiments wherein the carboxylic acid anhydride is selected from aromatic acid anhydrides such as, for example, benzoic, phthalic, or naphthoic, and such non-aromatic anhydrides as acetic, propionic, succinic, or maleic.

The invention also provides a curable composition which comprises a hydroxy terminated polybutadiene, a polyisocyanate, a metallo organic compound, and a carboxylic acid or a compound convertible thereto by reaction with Zerewitinoff active hydrogen.

The invention also provides a process for the control of the pot life and curing rate of a hydroxy terminated polybutadiene based polyurethane bound propellant grain which comprises; admixing with a propellant grain containing said binder in an uncured state, a catalyst comprising a metallo organic compound and a carboxylic acid or a compound convertible thereto by reaction with Zerewitinoff active hydrogen.

The invention also provides a cured hydroxy terminated polybutadiene based polyurethane bound propellant grain which contains the reaction products of the reaction of a cure catalyst comprising a metallo organic compound and a carboxylic acid or a compound convertible thereto by reaction with Zerewitinoff active hydrogen with said propellant grain during the curing process.

The invention also provides a curable composition with comprises a liquid polyurethane prepolymer, a polyurethane prepolymer curing agent, a metallo organic compound, and a carboxylic acid or a compound convertible thereto by reaction with Zerewitinoff active hydrogen.

The invention also provides a process for the control of the pot life and the curing rate of a polyurethane, casting or molding resin which comprises admixing with a curable liquid polyurethane prepolymer and polyurethane prepolymer curing agent, a catalyst comprising a metallo organic compound and a carboxylic acid or a compound convertible thereto by reaction with Zerewitinoff active hydrogen.

The invention also provides an article of manufacture comprising the reaction products of a liquid polyurethane prepolymer, a polyurethane prepolymer curing agent, a metallo organic compound and a carboxylic acid or a compound convertible thereto by reaction with Zerewitinoff active hydrogen.

DESCRIPTION OF THE PREFERRED EMBODIMENT

The manner of making and using the invention will now be illustrated with reference to a specific embodiment thereof, namely a catalyst comprising triphenyl bismuth and maleic anhydride.

The precursor ingredients for the cured propellant grain are mixed in conventional fashion. For example, a liquid hydroxy terminated polybutadiene prepolymer, conveniently that sold by Arco Chemical Company under the designation R45M, is blended with oxidizer, conveniently ammonium perchlorate, and a polyisocyanate, conveniently isophorone diisocyanate. To this mixture, triphenyl bismuth and maleic anhydride are added. After sufficient blending to assure uniform mixing the propellant mixture is cast into place in a prepared rocket motor casing while employing the usual methods for assuring void free casting, as for example, deaeration. The mixture is then cured by standard technique.

One skilled in the art will recognize that in addition to the R45M hydroxy terminated polybutadiene prepolymer and isophorone diisocyanate curing agent illustrated herein, any of the hydroxy terminated polybutadienes and polyisocyanate curing agents known to be suitable as binders and curing agents respectively may be substituted as full equivalents when using the invention. Similarly in addition to the ammonium perchlorate oxidizer illustrated other oxidizers known in the art to be suitable may be used. If desired, metallic fuels may be incorporated. Various burn rate control agents, plasticizers, and other additives such as carbon black and the like may also be added to the propellant during formulation. It will also be obvious that processing may be accomplished at the usual temperature ranges normally employed, that is from about 60° C. to about 63° C.

In addition to the triphenyl bismuth illustrated any metallo organic compound of the general formula $MR_m$ where M is an m-valent metal such as bismuth, lead, tin, arsenic, zinc, copper, cadmium, potassium and the like, and R is selected from alkyl or aryl groups such as phenyl, tolyl, benzyl, naphthyl, alkyl of 1 to 20 carbon atoms, or cycloalkyl of 5 to 20 carbon atoms such as methyl, ethyl, hexyl, cyclopentyl, methyl cyclohexyl and the like may be substituted. For the maleic anhydride which is a compound convertible to a carboxylic acid by reaction with Zerewitinoff active hydrogen may be substituted any carboxylic acid anhydride such as acetic, propionic, oleic, succinic, phthalic, benzoic, or naphthoic anhydride or carboxylic acids such as acetic, butyric, oleic, linoleic, benzoic, toluic, salicylic, maleic and the like.

One skilled in the art would recognize that the addition of the catalyst composition may be accomplished at any time during the blending process but for optimum pot life it should desirably take place after addition of the polyisocyanate curing agent at the end of the blending process. If it is desired to further extend the pot life in the presence of the catalyst a metallic oxide such as the alkaline earth metal oxides, for example calcium oxide or magnesium oxide, may be incorporated with the catalyst.

The relative amounts of the components of the catalyst mixture may be varied. While normally equal amounts by weight of both the metallo organic compound and the carboxylic acid or compound convertible thereto by reaction with Zerewitinoff active hydrogen are usually employed either may be present in up to five fold excess of the other. If present, the metallic oxide would normally be used in an equal weight proportion to the least abundant component of the catalyst system but the quantity may be varied from 1/5 of this proportion to a five fold excess.

The catalyst system may be incorporated in the propellant composition at 0.01 to 1.0% by weight of the total weight of the propellant, preferably at 0.05 to 0.1% weight.

One skilled in the art will recognize that this catalytic system will be generally applicable to the cure of urethane resin systems in general, particularly those wherein the cure reaction is presently or may be, accelerated by the use of metal salt catalysts.

These systems are, of course, normally prepared from liquid polyurethane prepolymers and polyurethane prepolymer curing agents.

The liquid polyurethane prepolymers are compounds of types readily familiar to those skilled in the art. They are either compounds having two or more active hydrogens capable of polymerizing when reacted with a polyisocyanate, preferably those having as the sole reacting groups hydroxyl or thiol groups, or these active hydrogen compounds prereacted with polyisocyanate to give an isocyanate terminated prepolymer.

The isocyanates useable either directly as curing agents for the active hydrogen compounds or as capping agents for these compounds to prepare the other class of liquid polyurethane prepolymers may be any polyfunctional organic isocyanate which has isocyanates as the sole reactive groups amenable to reaction with active hydrogen. Both alkylene and arylene isocyanates are suitable. In addition to the isophorone diisocyanate illustrated above, other illustrative but not limiting isocyanates are:

(a)

Alkane diisocyanates;
Ethylene diisocyanate;
Trimethylene diisocyanate;
Propylene-1,2-diisocyanate;
Tetramethylene diisocyanate;
Butylene-1,3-diisocyanate;
Octadecamethylene diisocyanate;
and the like, (b)

Alkene diisocyanates,
1-propylene-1,2-diisocyanate;
2-propylene-1,2-diisocyanate;
1-butylene-1,2-diisocyanate;
3-butylene-1,2-diisocyanate;
1-butylene-1,3-diisocyanate;
1-butylene-2,3-diisocyanate;
and the like, (c)

Alkylidene diisocyanates,
Ethylidene diisocyanate;
Propylidene-1,1-diisocyanate;
Propylidene-2,2-diisocyanate;
and the like, (d)

Cycloalkylene diisocyanates,
Cyclopentylene-1,3-diisocyanate;
Cyclohexylene-1,3-diisocyanate;
Cyclohexylene-1,2-diisocyanate;
Cyclohexylene-1,4-diisocyanate;
and the like, (e)

Cycloalkylidene diisocyanates,
Cyclopentylidene diisocyanate;
Cyclohexylidene diisocyanate;
and the like, (f)

Carbocyclic aromatic diisocyanates,
m-Phenylene diisocyanate;
o-Phenylene diisocyanate;
p-Phenylene diisocyanate;
1-methyl-2,4-phenylene diisocyanate;
Naphthylene-1,4-diisocyanate;
Diphenylene-4,4'-diisocyanate;
2,4-tolylene diisocyanate;
2,6-tolylene diisocyanate;
4,4'-diphenylmethane diisocyanate;
1,5-naphthylene diisocyanate;
Methylene-bis-(4-phenyl isocyanate);
Xylylene-1,4-diisocyanate;
Xylylene-1,3-diisocyanate;
4,4'-diphenylmethane diisocyanate;
4,4'-diphenylene propane diisocyanate;
and the like, (g)

Diisocyanates containing heteroatoms,
OCN—CH$_2$CH$_2$—O—CH$_2$CH$_2$—NCO;
2,3-pyridine diisocyanate;
and the like, (h)

Other diisocyanates containing various non-reactive substituents,
1-chlorophenyl-2,4-diisocyanate;
1-nitrophenyl-2,4-diisocyanate;
1,3-dichlorophenyl-4,6-diisocyanate;
1,4-dichlorophenyl-2,5-diisocyanate;
1-chloro-4-methoxy phenyl-2,5-diisocyanate;
1-methoxy phenyl-2,4-diisocyanate;
1-methyl-4-methoxy phenyl-2,5-diisocyanate;
1-ethoxy phenyl-2,4-diisocyanate;
1,3-dimethoxy phenyl-4,6-diisocyanate;
1,4-dimethoxy phenyl-2,5-diisocyanate;
1-propoxy phenyl-2,4-diisocyanate;
1-isobutoxy phenyl-2,4-diisocyanate;
1,4-diethoxy phenyl-2,5-diisocyanate;
and the like, and (i)

other representative polyisocyanates,
Diphenylether-2,4-diisocyanate;
1,1-dinaphthalene-2,2'-diisocyanate;
3,3'-dimethylbiphenyl-4,4'-diisocyanate;
3,3'-dimethoxybiphenyl-4,4'-diisocyanate;
3,3'-dimethoxydiphenylmethane-4,4'-diisocyanate;
3,3'-dichlorodiphenyldimethylmethane-4,4'-diisocyanate;
Benzophenone-3,3'-diisocyanate;
3-butoxyhexamethylene diisocyanate;
1,2-dimethylcyclohexane diisocyanate;
1,4-dimethylnaphthalene diisocyanate;
1,5-dimethylnaphthalene diisocyanate;
Dicyclohexylmethane-,4,4'-diisocyanate;
Dicyclohexylmethylmethane-4,4'-diisocyanate;
Dicyclohexyldimethylmethane-4,4'-diisocyanate;
2,2'-dimethyldicyclohexylmethane-4,4'-diisocyanate;
3,3',5,5'-tetramethyldicyclohexylmethane-4,4'-diisocyanate;
3-nitrotriphenylmethane-4,4'-diisocyanate;
Pyrene-3,8-diisocyanate;
Chrysene-2,8-diisocyanate;
Dianisidine diisocyanate;
4,4'-diphenylether diisocyanate;
Isopropylidene bis[phenyl or cyclohexyl isocyanate];
Chlorodiphenyl diisocyanate;
4,4',4''-triphenylmethane triisocyanate;
1,3,5-triisocyanate benzene;
Phenylethylene diisocyanate.

The preferred hydroxy starting materials are dihydroxy compounds having the general formula:

HO—R—OH wherein R is a divalent organic radical. The hydroxy groups may be of any type suitable for the urethane reaction with isocyanate groups such as, for example, alcoholic or phenolic hydroxyl groups. The following dihydroxy compounds are illustrative of compounds suitable as reactants in this invention.

(a)

Alkane diols having a chain length of from 2 to 20 carbon atoms inclusive such as:
2,2-dimethyl-1,3-propanediol;
Ethylene glycol;

Tetramethylene glycol;
Hexamethylene glycol;
Heptamethylene glycol;
Decamethylene glycol;
and the like, (b)

alkene diols, such as;
1-propylene-1,2-diol;
2-propylene-1,3-diol;
1-butylene-1,2-diol;
3-butylene-1,2-diol;
1-hexylene-1,3-diol;
1-butylene-2,3-diol;
and the like, (c)

cycloalkylene diols, such as:
Cyclopentylene-1,3-diol;
Cyclohexylene-1,2-diol;
Cyclohexylene-1,3-diol;
Cyclohexylene-1,4-diol;
and the like, (d)

Carbocyclic aromatic diols, such as:
Catechol;
Resorcinol;
Quinol;
1-methyl-2,4-benzene diol;
2-methyl-1,3-naphthalene diol;
3,4-toluene diol;
Xylylene-1,4-diol;
Xylylene-1,3-diol;
1,5-naphthalene dimethanol;
2-ethyl-1-phenyl-3-butene-1,2-diol;
2,2-di(4-hydroxyphenyl) propane;
and the like.

(e)

Diols containing hetero atoms, such as:
Di-(β-hydroxyethyl) ether;
6-methyl-2,4-pyrimidine diol;

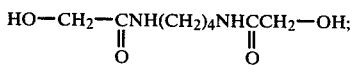

Bis-(β-hydroxyethyl) formal;
Dithiodiglycol;
and the like.

Also included among the polyfunction polyols suitable as reactants in the invention are polyalkylene ether, thioether, and ether-thioether glycols represented by the general formula:

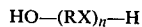

wherein R represents the same or different alkylene radicals containing up to about 19 carbon atoms, X represents oxygen or sulfur, and m is an integer large enough so that the molecular weight of the polyalkylene ether, thioether, or ether-thioether glycol is at least about 400, e.g., from about 400 to about 10,000. The polyalkylene ether glycols included within this general formula, such as polyethylene glycols, polypropylene glycols, polybutylene glycols, polytetramethylene glycols, polyhexamethylene glycols, and the like, which are obtained, for example, by acid-catalyzed condensation of the corresponding monomeric glycols or by the condensation of lower alkylene oxides, such as ethylene oxide, propylene oxide, and the like, either with themselves or with glycols such as ethylene glycol, propylene glycol, and the like are preferred.

Polyalkylenearylene ether, thioether and ether-thioether glycols which also have molecular weights ranging from about 400 to about 10,000 but which differ from the above-described polyalkylene glycols in having arylene radicals, such as phenylene, naphthylene and arylene radicals, either unsubstituted or substituted, e.g., with alkyl or aryl groups, and the like, in place of some of the alkylene radicals of said polyalkylene glycols may also be employed as polyol reactants. Polyalkylenearylene glycols of the type ordinarily used for this purpose will usually contain at least one alkylene ether radical having a molecular weight of about 500 for each arylene radical present.

Essentially linear polyesters containing a plurality of isocyanate-reactive hydroxyl groups constitute another class of reactive organic polyfunctional polyols which may be employed in preparing polyurethane useful in the practice of the present invention. While the preparation of polyesters suitable for this purpose has been described in great detail in the prior art, and forms no part of the present invention per se, it may be mentioned here by way of illustration that polyesters of this type may be prepared by the condensation of a polyhydric alcohol, generally a saturated aliphatic diol such as ethylene glycol, propanediol-1,2,propanediol-1,3,butanediol-1,3, butanediol-1,4 pentanediol-1,2,pentanediol-1,5, hexanediol-1,3, hexanediol-1,6 diethylene glycol dipropylene glycol, triethylene glycol, tetraethylene glycol, and the like, as well as mixtures of such diols with each other and with minor amounts of polyols having more than two hydroxyl groups, preferably saturated aliphatic polyols such as glycerol, trimethylol ethane, trimethylol propane, pentaerythritol, sorbitol, and the like, with a polycarboxylic acid or anhydride, generally a dicarboxylic acid or anhydride which is either saturated or which contains only benzenoid unsaturation, such as oxalic, malonic, succinic, glutaric, adipic, pimelic, suberic, azelaic, sebacic, malic, phthalic, cyclohexanedicarboxylic, and endomethylenetetrahydrophthalic acids, and the like and their isomers, homologs, and other substituted derivatives, e.g. chloroderivatives, or with mixtures of such acids with each other and with unsaturated dicarboxylic acids or anhydrides such as maleic, fumaric, citraconic, and itaconic acids, and the like, as well as with polycarboxylic acids containing three or more carboxyl groups such as aconitic acid and the like.

The essentially linear polyesters commonly used in preparing polyurethane resins preferably have molecular weights ranging from about 750 to about 3,000. In addition, they will generally have relatively low acid numbers, e.g., acid number not appreciably in excess of about 60 and preferably as low as can be practicably obtained, e.g., 2 or less. Correspondingly, they will generally have relatively high hydroxy numbers, e.g., from about 30 to about 700. When preparing these polyesters, an excess of polyol over polycarboxylic acid is generally used to insure that the resulting essentially linear polyester chains contain a sufficient amount of reactive hydroxyl groups.

Another class of suitable organic polyfunctional polyol reactants includes polyalkylene ether polyols containing more than two reactive hydroxyl groups such as polyalkylene ether triols tetrols, and the like, which are prepared, for example, by reacting polyols such as glycerol, trimethylol ethane, trimethylol propane, pentaerythritol, dipentaerythritol, sorbitol, and the like, with lower alkylene oxides such as ethylene oxide, propylene oxide, and the like.

Nitrogen-containing polyfunctional polyols may also be used as polyol reactants. Among such materials there are included the polyesteramides conventionally employed in the preparation of polyurethane resins, i.e. those having molecular weights ranging from about 750 to about 3,000, acid numbers ranging from about 60 as a maximum to as low as can be practicably obtained, e.g. 2 or less, and hydroxyl numbers ranging from about 30 to about 700, and also high molecular weight polyamino alcohols, such as hydroxypropylated alkylene diamines of the general formula:

$$(HOH_6C_3)_2N-R_a-N(C_3H_6OH)_2$$

wherein $R_a$ represents an alkylene radical having from 2 to 6 carbon atoms, inclusive of which, N,N,N',N'-tetrakis-(2-hydroxypropyl)-ethylenediamine is a representative species, as well as higher analogs thereof, such as hydroxypropylated polyalkylenepolyamines of the general formula $$(HOH_6C_3)_2N-R_a-N-R_a-N(C_3H_6OH)_2$$
$$\underset{C_3H_6OH}{|}$$

wherein $R_a$ is a defined hereinabove (see U.S. Pat. No. 2,697,118 to Lundsted et al.).

As can be readily appreciated, mixtures of the various reactive organic polyfunctional polyols described hereinabove may also be employed as or in preparing polyurethane prepolymers useful in the practice of the present invention.

Polysulfides having two or more thiol groups such as ethylene disulfide and the various well-known liquid polysulfide polymers and polysulfides having glycol end groups such as those having the general formula:

$$HO-R-S_x)_n R-OH$$

wherein R is alkylene, arylene, dialkylene formal and the like, x is 2 to 4 and n is a whole number, are other suitable reactants for the invention.

It will be appreciated that polyols, polythiols, as well as polyols and polythiols end-capped with isocyanates, by methods well-known in the art, in the molecular weight range of 400 to 10,000 usually 600 to 7,000, are suitable liquid polyurethane prepolymers for the practice of this invention.

One skilled in the art will also appreciate that polyisothiocyanates and polythiols react to yield urethane-type products. Consequently these compounds are also equivalents contemplated to be within the scope of the invention.

The polyurethane prepolymer curing agents contemplated for use in this invention are those well-known in the art. Suitable curing agents will of course contain two or more groups capable of chemically reacting with the terminal functional groups of the particular liquid polyurethane prepolymers selected for use. If hydroxyl or thiol terminated prepolymers are selected it will be obvious that organic polyisocyanates of the type illustrated hereinabove will be the curing reagents of choice. If isocyanate or isothiocyanate terminated prepolymers are selected, it will be apparent that poly hydroxyl or poly thiol terminated compounds as illustrated hereinabove will be suitable curing reagents. In this case polyamines, such as, the known polyamine polyurethane curing agents, for example, methylene bis orthochloroaniline and hydroxy amines may be used as curing agents.

The formulation of the curable polyurethane resin compositions of the invention may be accomplished in a fashion analogous to that described above for the mixing of the polyurethane based propellants, that is the liquid polyurethane prepolymer may be blended with any desired additives such as plasticizers, fillers, coloring agents, reinforcing agents and the like and then the curing agent and cure catalyst are added and blended. Subsequent molding or casting and curing are then performed under standard known conditions to assure uniformity in casting and defect free cured materials.

The temperature employed in blending and molding or casting will desirably be low enough to assure that the cure reaction not be accelerated by thermal energy to shorten pot life but will be high enough to maintain all ingredients in a homogeneous liquid state and with a low enough viscosity to permit mechanical transfer and accurate conformance to any mold shape. As stated above it is desirable for large moldings and castings to have a long pot life so as to permit all the blended material to retain a homogeneous consistency during transfer into the mold. The cure reaction will be allowed to proceed at a temperature high enough to assure an economical cure speed but not so high that on cooling distortion of the cured object occurs due to induced thermal stresses or at such high temperatures that in a large casting temperature uniformity throughout the entire object is difficult to obtain resulting in an irregular cure. The use of the catalyst of the present invention allows the onset of accelerated cure to be delayed permitting longer molding or casting operation times while leading to acceleration of the cure reaction after casting or molding has been completed permitting economical cure times without the need of excessive thermal acceleration.

The quantities and proportions of the catalytic ingredients for a particular resin system may obviously be varied within wide limits depending on the particular liquid polyurethane prepolymer selected, the polyurethane prepolymer curing agent selected, the pot life desired, and the curing rate desired, but normally the proportions will be within the limits set forth for the use of the catalyst with the polyurethane propellant grain binders.

The following example further illustrates the best mode contemplated by the inventors for the practice of their invention.

EXAMPLE

Propellant formulations having hydroxy terminated polybutadiene binder (Arco R45M) were cured with isophorone diisocyanate at the NCO/OH ratios shown in the table. The amount of catalyst and metal oxide present in each formulation is also shown in the table, as is the pot life (time to reach 40 Kp unless otherwise specified) and time to complete cure.

TABLE

| Sample | NCO/OH | Catalyst and Metal Oxide | Pot Lite (Hrs.) | Cure Time (Hrs.) |
|---|---|---|---|---|
| A | .87 | None | 12 Kp/11 hrs. | 336 |
| B | .88 | Φ₃Bi, 0.040% MA*, 0.040% MgO, 0.020% | 7.2 | 24 |
| C | .82 | None | 8 Kp/9 hrs. | 240 |
| D | .82 | Φ₃Bi, 0.040% MA, 0.040% MgO, 0.020% | 6.5 | 24 |
| E | .87 | None | 18 Kp/9 hrs. | 312 |
| F | .87 | Φ₃Bi, 0.025% MA, 0.025% MgO, 0.025% | 9.5 | 24 |
| G | .87 | None | 3–10.5 | 336 |
| H | .87 | Φ₃Bi, 0.025% MA, 0.025% MgO, 0.025% | 2.5 | 48 |
| I | .80 | None | 10 | 336 |
| J | .80 | Φ₃Bi, 0.040% MA, 0.040% MgO, 0.040% | 4 | 24 |

*MA is maleic anhydride

The subject matter which applicants regard as their invention is particularly pointed out and distinctly claimed as follows:

1. A curable composition comprising a hydroxy terminated polybutadiene, a polyisocyanate and an effective amount of a cure catalyst therefor, said catalyst comprising a metallo organic compound of the formula $MR_m$ where M is an m-valent metal selected from bismuth, lead, tin, arsenic, zinc, copper, cadmium or potassium and R is phenyl, tolyl, benzyl, naphthyl, alkyl of 1 to 20 carbon atoms or cycloalkyl of 5 to 20 carbon atoms and a carboxylic acid or a compound convertible to a carboxylic acid by reaction with Zerewitinoff active hydrogen.

2. A curable composition which comprises a liquid polyurethane prepolymer, a polyurethane prepolymer curing agent and an effective amount of a cure catalyst therefor, said catalyst comprising a metallo organic compound of the formula $MR_m$ wherein M, R and $m$ are as defined in claim 1, and a carboxylic acid or a compound convertible to a carboxylic acid by reaction with Zerewitinoff active hydrogen.

3. A process for the control of the pot life and the curing rate of a polyurethane casting or molding resin which comprises admixing with a curable liquid polyurethane prepolymer and a polyurethane prepolymer curing agent and an effective amount of a catalyst, said catalyst comprising a metallo organic compound of the formula $MR_m$ wherein M, R and $m$ are as defined in claim 1 and a carboxylic acid or a compound convertible to a carboxylic acid by Zerewitinoff active hydrogen.

4. An article of manufacture comprising the reaction products of a liquid polyurethane prepolymer, a polyurethane prepolymer curing agent and a cure catalyst therefor, said cure catalyst comprising a metallo organic compound of the formula $MR_m$ wherein M, R and $m$ are as defined in claim 1 and a carboxylic acid or a compound convertible thereto by reaction with Zerewitinoff active hydrogen.

5. A curable composition as defined in claim 2 wherein the liquid polyurethane prepolymer is selected from: polyester polyols, alkane diols of from 2 to 20 carbon atoms, alkene diols, cycloalkylene diols, carbocyclic aromatic diols, heterocyclic containing diols, polyalkylene ether polyols, polyalkylene thioether polyols, polyalkylene ether-thioether polyols, polyalkylenearylene ether polyols, polyalkylenearylene thioether polyols, polyalkylenearylene ether-thioether polyols, polyesteramide polyols, polyamino alcohols, ethylene disulfide, liquid polysulfide polymers, or polysulfide polymers having glycol end caps; and the polyurethane prepolymer curing agent is selected from polyisocyanates; or the liquid polyurethane prepolymer is selected from isocyanate terminated moieties derived from: polyester polyols, alkane diols of from 2 to 20 carbon atoms, alkene diols, cycloalkylene diols, carbocyclic aromatic diols, heterocyclic containing diols, polyalkylene ether polyols, polyalkylene thioether polyols, polyalkylene ether-thioether polyols, polyalkylenearylene ether polyols, polyalkylenearylene thioether polyols, polyesteramide polyols, polyamino alcohols, ethylene disulfide, liquid polysulfide polymers, or polysulfide polymers having glycol end caps; and the polyurethane prepolymer curing agent is selected from: polyhydroxyl compounds, polythiols, polyamines, or hydroxy amines.

6. A curable composition as defined in claim 5 wherein the liquid polyurethane prepolymer is selected from: polyester polyols, polyether polyols; or polyester polyols and polyether polyols terminated with isocyanates.

7. A curable composition as defined in claim 2 wherein the compound convertible to a carboxylic acid by reaction with Zerewitinoff active hydrogen is a carboxylic acid anhydride.

8. A curable composition as defined in claim 5 wherein the compound convertible to a carboxylic acid by reaction with Zerewitinoff active hydrogen is a carboxylic acid anhydride.

9. A curable composition as defined in claim 6 wherein the compound convertible to a carboxylic acid by reaction with Zerewitinoff active hydrogen is a carboxylic acid anhydride.

* * * * *